United States Patent
Kawasaki

(10) Patent No.: US 7,656,277 B2
(45) Date of Patent: Feb. 2, 2010

(54) APPARATUS FOR DETECTING THE PRESENCE OF FOG FOR AUTOMOTIVE VEHICLE

(75) Inventor: Naoki Kawasaki, Kariya (JP)

(73) Assignee: Denso Corporation, Kariya (JP)

( * ) Notice: Subject to any disclaimer, the term of this patent is extended or adjusted under 35 U.S.C. 154(b) by 308 days.

(21) Appl. No.: 11/900,427

(22) Filed: Sep. 12, 2007

(65) Prior Publication Data

US 2008/0061950 A1 Mar. 13, 2008

(30) Foreign Application Priority Data

Sep. 12, 2006 (JP) .............................. 2006-247125

(51) Int. Cl.
*H04B 3/36* (2006.01)
*G01W 1/00* (2006.01)
*G08B 21/00* (2006.01)
*G09B 9/00* (2006.01)
*H04N 7/18* (2006.01)

(52) U.S. Cl. .................... 340/425.5; 340/601; 340/602; 348/122; 348/148

(58) Field of Classification Search ........................ None
See application file for complete search history.

(56) References Cited

U.S. PATENT DOCUMENTS 6,037,976 A * 3/2000 Wixson ...................... 348/122

FOREIGN PATENT DOCUMENTS

| JP | 11-139262 | 5/1999 |
|----|-----------|--------|
| JP | 11-326541 | 11/1999 |
| JP | 2001-028746 | 1/2001 |
| JP | 2003-132458 | 5/2003 |
| JP | 2006-349492 | 12/2006 |
| WO | WO 03/069275 | 8/2003 |

OTHER PUBLICATIONS

U.S. Appl. No. 11/598,857, filed Nov. 2006, Kawasaki.

* cited by examiner

*Primary Examiner*—Julie Lieu
(74) *Attorney, Agent, or Firm*—Harness, Dickey & Pierce, PLC

(57) ABSTRACT

An on-vehicle fog-presence determining apparatus having image fog-state determining means for determining whether or not an image picked up by an on-vehicle camera mounted on a vehicle is disclosed. The apparatus comprises far-flung brightness acquiring means for acquiring a brightness of a far-flung road region, sky brightness acquiring means for acquiring a brightness of a sky around the vehicle and image fog-state determining means for making judgment using the brightness of the far-flung road region and the brightness of the sky.

5 Claims, 8 Drawing Sheets

APPARATUS FOR DETECTING THE PRESENCE OF FOG FOR AUTOMOTIVE VEHICLE

CROSS REFERENCE TO RELATED APPLICATION

The present application relates to and incorporates by references Japanese Patent Application No. 2006-247125 filed on Sep. 12, 2006.

BACKGROUND OF THE INVENTION

1. The Field of the Invention

The present invention relates to an apparatus for determining whether or not fog is present in an environment around a vehicle using images picked up by a camera mounted on the vehicle.

2. Description of the Related Art

There has been known an apparatus for executing an image processing on a picked up image of an on-vehicle camera for determining the presence of fog (as disclosed in, for instance, Japanese Patent No. 3444192). In Japanese Patent No. 344419, the presence of fog is determined based on a degree of image blurring. With fog being present, the image gets blurred. Thus, the presence of fog is determined upon the estimated degree of image blurring. In estimating the degree of image blurring, first, a differential calculus is executed for each pixel of an entire image to calculate a rate of change of brightness (the amount of edges) in each pixel of the image. The brightness variations are used to estimate the degree of image blurring.

With the apparatus disclosed in Japanese Patent No. 3444192, the result of determining the presence of fog is utilized in recognizing a white line on a road. In recognizing the white line on the road on which a vehicle is traveling based on an image picked up by the on-vehicle camera, if fog is present in an atmosphere on the road, the image gets blurred with a resultant difficulty of recognizing the white line. Therefore, the presence of fog is determined prior to recognizing the white line. It is also disclosed that if the presence of fog is determined, fog lamps are turned on.

An apparatus, disclosed in Japanese Patent No. 3312729, is not of a type that determines only the presence of fog. If an image gets blurred due to bad visibility caused by fog or the like, or, dirt on a windscreen of a vehicle, it becomes hard to appropriately monitor the vehicle exterior (i.e., a monitoring a distance between an own vehicle and an object at a distance from the vehicle, i.e, exterior of the vehicle). To address such an issue, the determination is made whether or not the image is blurred.

In the method of determining the image blurring disclosed in Japanese Patent No. 3312729, a representative value of the brightness variation of the image is calculated based on the brightness variations in a fixed portion of the image, wherein the fixed portion is set to an upper center section of the image. In more detail, the representative value of the brightness variation of the image is estimated based on a ratio of the number of pixels in which the brightness variation exceeds a predetermined threshold value.

Both the apparatuses, disclosed in Japanese Patent No. 3444192 and Japanese Patent No. 3312729, determine whether or not the image picked up by the on-vehicle camera gets blurred for thereby making a judgment on the presence of fog. If the brightness variations of each pixel of an entire image are calculated, an issue arises with an increase in processing time or load for carrying out the image processing as disclosed in Japanese Patent No. 3444192. Meanwhile, with the apparatus disclosed in Japanese Patent No. 3312729, the brightness variations of only the fixed area, set to the upper center section thereof, are calculated, resulting in a lower load or shorter processing time than that of the device disclosed in Japanese Patent No. 3444192. However, in image object in the image of a close range object to the own vehicle is relatively and clearly picked up even in the presence of fog. Therefore, if the object is picked up in the fixed area on the image at a close range from the vehicle, an issue arises with a difficulty of precisely determining the presence of fog.

With the above view in mind, the present applicant has made an invention on an apparatus, operative to determine the presence of fog using an image of a far-flung road region determined on the image picked up by an on-vehicle camera for representing a region over a road in a given far-flung distance from a vehicle, of which patent application was filed (Japanese Patent Laid-open publication No. 2006-349492). Thus, if the region of the image for which the presence of fog is determined is allocated to the region over the road, it is highly likely that due to the road normally continuing to a far-flung area, such a far-flung area involves a pickup image of a far-flung portion. This enables the presence of fog to be precisely determined.

Further, WO 03/069275 discloses means for determining whether or not fog is present in outside air, surrounding a field of view from a driver's seat and a vehicle, in an image picked up by an on-vehicle camera.

With such a method, a road portion and a sky portion are determined based on brightness in the image picked up by the on-vehicle camera. Thereafter, a calculation is executed to obtain coefficients of extinction in both areas under a Koschmieder's low, upon which the field of view is produced and the existence of or nonexistence of fog is determined based on the resulting coefficients of extinction.

However, with the apparatuses disclosed in Japanese Patent Laid-open publication No. 2006-349492 or WO 03/069275 for determining the presence of fog, it is likely that when picked up by the on-vehicle camera mounted on a vehicle running on a road passing through a forest like a mountain corridor, a far-flung road region is present in the forest and, therefore, underexposure phenomena occurs in the pickup image. If such underexposure phenomena are present in the far-flung road region, there is a possibility of determining in error that the image is enveloped in fog.

The present invention has been completed with a view to addressing such issues and has an object to ensure a precision in determining the presence of fog even if underexposure phenomena occur in a far-flung road region of an image.

SUMMARY OF THE INVENTION

To achieve the above objects, there is provided an on-vehicle fog-presence determining apparatus having an image fog-state determining means for determining whether or not an image, picked up by an on-vehicle camera mounted on a vehicle, is an image enveloped in fog, the apparatus comprising far-flung brightness acquiring means for acquiring a brightness of a far-flung road region, representing a region over a road in a given far-flung distance from an own vehicle, from the image picked up by the on-vehicle camera, and sky brightness acquiring means for acquiring a brightness of a sky around the vehicle, wherein the image fog-state determining means makes a determination using an image of the far-flung road region during a nonoccurrence of underexposure phenomena in the far-flung road region while making a determination using a brightness of the far-flung road region and a brightness of the sky during an occurrence of the underexposure phenomena in the far-flung road region.

DETAILED DESCRIPTION OF THE PREFERRED EMBODIMENT

Figure 1:
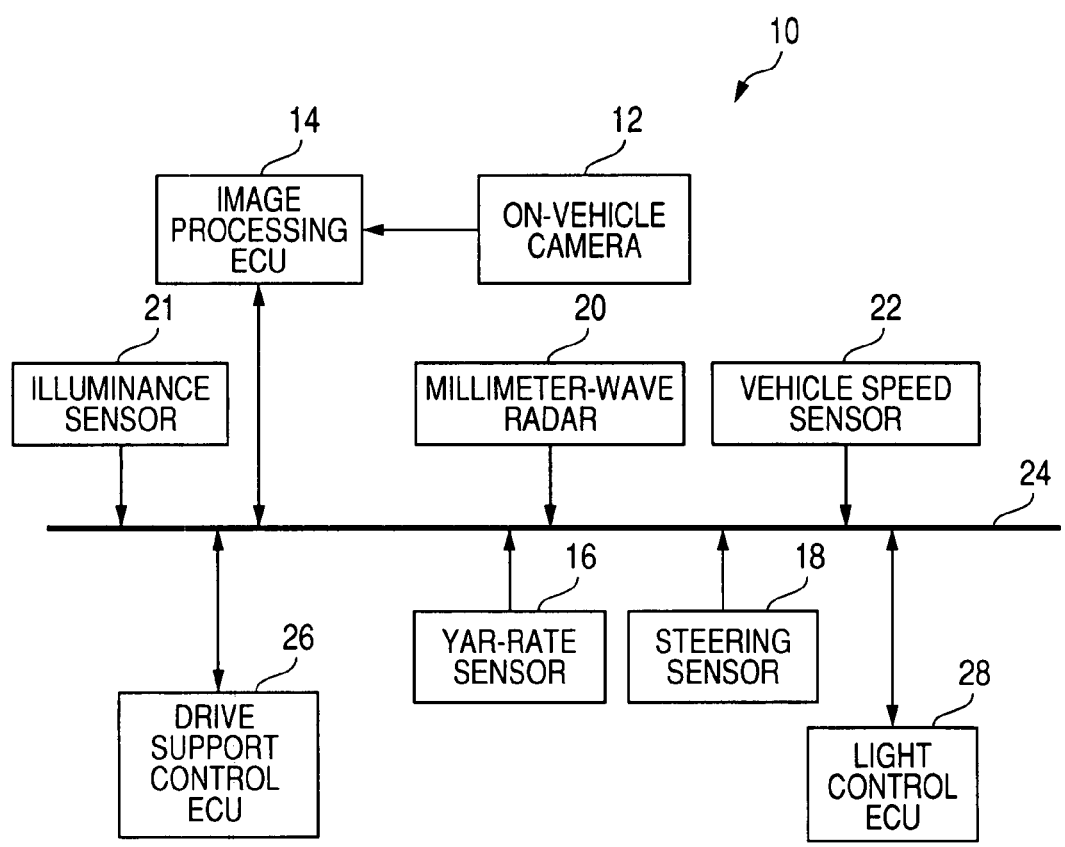
FIG. 1 is a block diagram showing a structure of an on-vehicle fog-presence determining apparatus 10 to which the present invention is applied.

Now, an on-vehicle fog-presence determining apparatus of an embodiment according to the present invention will be described below with reference to the accompanying drawings. FIG. 1 is a block diagram showing a structure of the on-vehicle fog-presence determining apparatus 10 to which the present invention is applied.

The on-vehicle fog-presence determining apparatus 10 includes an on-vehicle camera 12, an image processing ECU 14, a yaw-rate sensor 16, a steering sensor 18, a millimeter-wave radar 20, an illuminance sensor 21 and a vehicle speed sensor 22, which are connected to each other through an in-vehicle LAN 24. Connected to the in-vehicle LAN 24 are a drive support ECU 26 and a light control ECU 28.

The in-vehicle camera 12 is comprised of a CCD camera, which is mounted on an interior such as, for instance, a ceiling at an area close proximity to a driver's seat. The in-vehicle camera 12 picks up an image of a vehicle front to allow pickup image data to be delivered to and processed in the image processing ECU 14.

The image processing ECU 14 is comprised of a computer internally incorporating therein a CPU, a ROM and a RAM, etc. The RAM temporarily stores therein data of the images continuously picked up by the on-vehicle camera 12 for a certain time interval. Then, the CPU executes a basic sequence of operations shown in FIG. 2 to process image data stored in the ROM. The operations of the CPU will be described later.

The yaw-rate sensor 16 sequentially detects yaw rates of a vehicle and a steering sensor 18 sequentially detects steering angles of a steering wheel. Further, the millimeter-wave radar 20 outputs millimeter-waves toward the vehicle front and receives reflected waves coming from an objective. The drive support ECU 26 functions as vehicle front detecting means. The drive support ECU 26 continuously determines existence or nonexistence of a forward vehicle (a vehicle running in front of an own vehicle on the same traffic lane) based on the reflected waves received with the millimeter-wave radar 20.

With the forward vehicle being detected, then, the operation is executed to calculate a distance between the forward vehicle and the own vehicle, a relative azimuth and a relative velocity. In addition, a drive support control such as a vehicle speed control is executed based on calculated information.

The light control ECU 28 executes a control for automatically lighting on or lighting off fog lumps and headlights (not shown) based on an output brightness value of an illuminance sensor from the illuminance sensor 21. In addition, even with the image processing unit ECU 14 executing the operation to determine that fog is present, the operation is executed to control the lighting-on and lighting-off of fog lamps and head lights.

Figure 2:
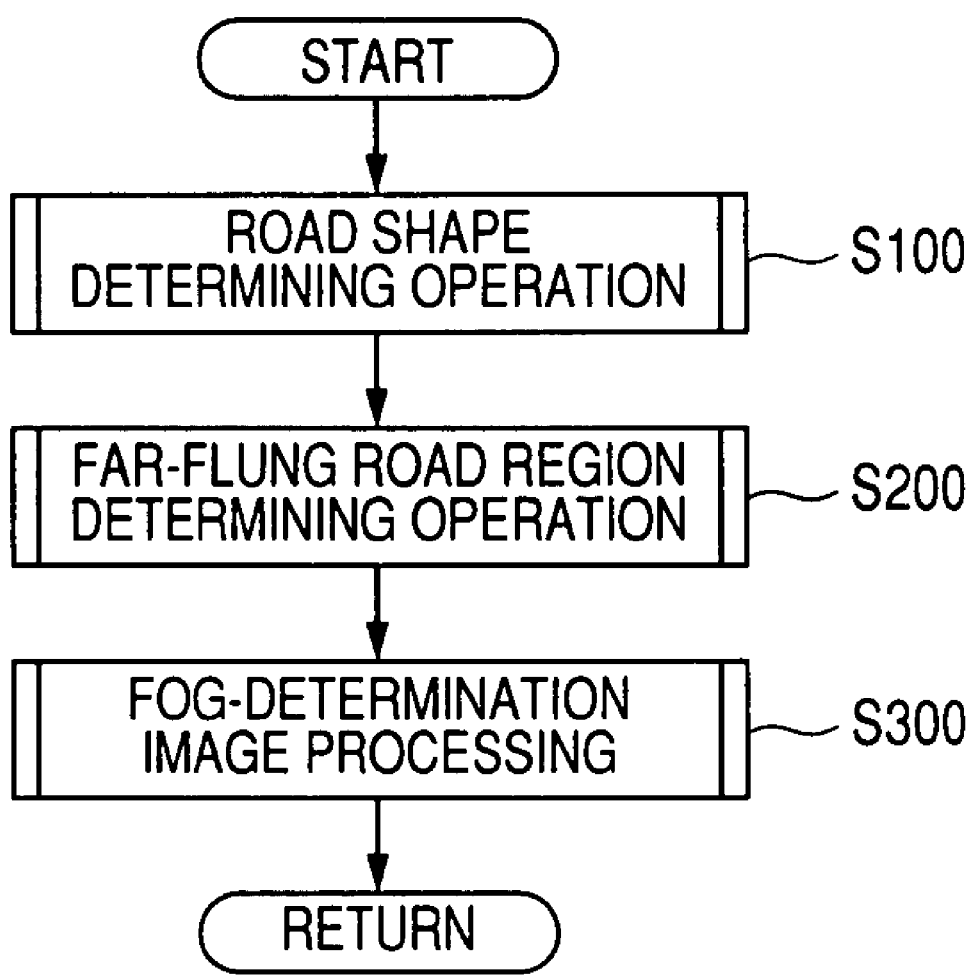
FIG. 2 is a flowchart showing an essence of a control function to be executed by an image processing ECU 14.
Figure 3:
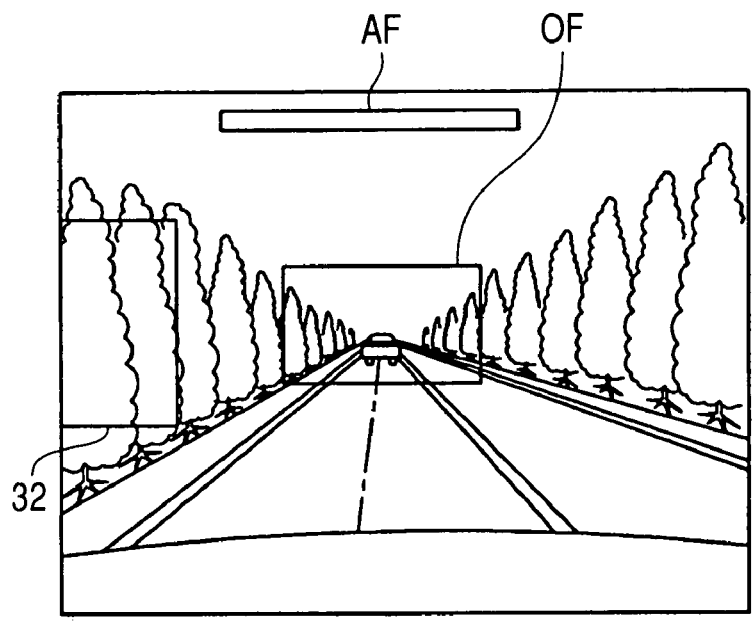
FIG. 3 is an exemplary image picked up by an on-vehicle camera 12.
Figure 4:
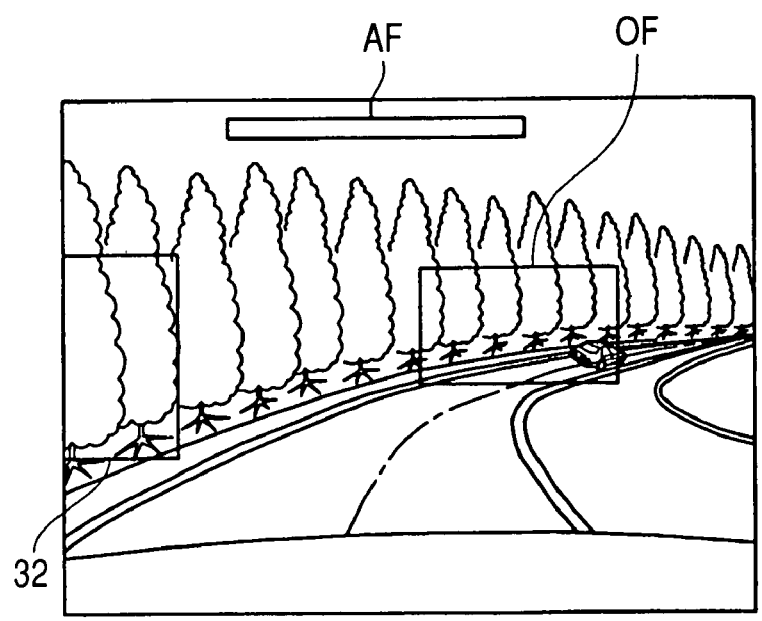
FIG. 4 is another exemplary image picked up by the on-vehicle camera 12.

FIG. 2 is a flowchart showing an essence of a control function to be executed by the image processing ECU 14. The control, shown in FIG. 2, is executed on a given cycle during the running of a vehicle and, during the execution of the control, the on-vehicle camera 12 continuously picks up an image of a vehicle in front of the own vehicle. FIGS. 3 and 4 are exemplary images picked up by the on-vehicle camera 12.

As shown in FIG. 2, the image processing ECU 14 executes a road-shape determining operation (in step S100) corresponding to road-shape determining means. Subsequently, the operation is executed in a far-flung region determining operation corresponding to far-flung region determining means (in step S200). Thereafter, a fog-presence determining image processing operation, corresponding to image fog-state determining means, is executed (in step S300).

Figure 5:
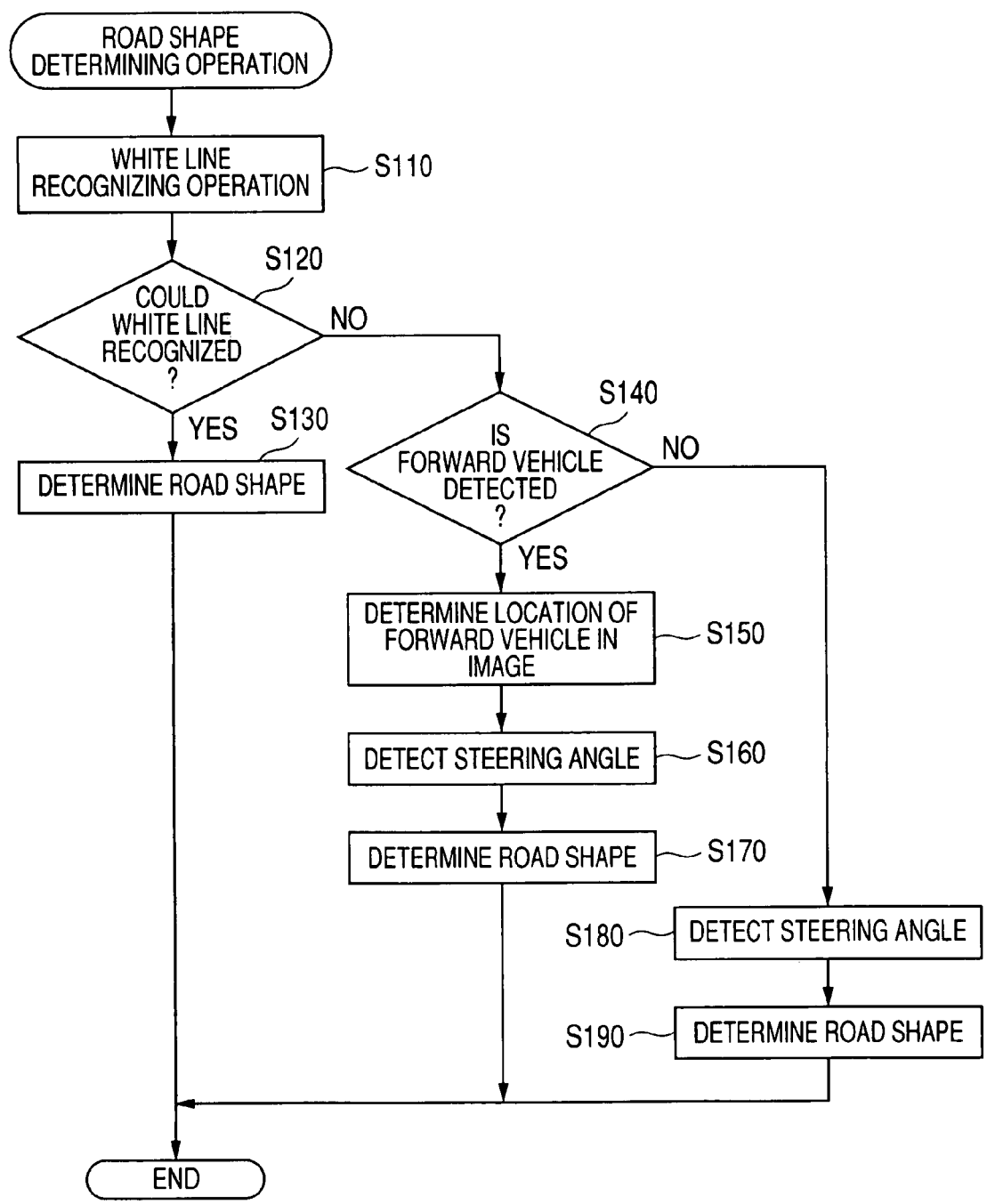
FIG. 5 is a flowchart showing a detail of a road shape determining operation in step S100 shown in FIG. 2.

The road-shape determining operation in step S100 is shown in FIG. 5 in detail. First in step S110 in FIG. 5, a white line recognizing operation is executed for recognizing a white line, indicative of a traffic sign provided along a traffic lane, based on a series of images continuously picked up by the on-vehicle camera 12. The white line recognizing operation may be implemented in various known processing techniques. For instance, the image, picked up by the one-vehicle camera 12, is subjected to binary image processing to extract a white line portion from the image resulting from the binary image processing for thereby recognizing the white line. As used herein, the term "white line" refers not only to the white line but also to a yellowline as similarly recognized in a normal white line recognizing operation.

It is not always true that the white line recognizing operation in step S110 can be effective to allow the white line to be recognized at all times. There occurs a probability where the white line cannot be recognized because, for instance, no white line was drawn on the road. Therefore, in succeeding step S120, the operation is executed to determine whether or not the white line could be recognized. The determination is made here for making a judgment whether or not the white-line could be recognized to the extent for the road shape to be determined in succeeding step S130. Thus, no need arises for both of the white lines to be recognized. Also, no need arises for the white line to be continuously recognized in a length from an own vehicle location to a vanishing point. That is, in step S120, the operation is executed to determine whether or not at least one of the white lines could be continuously recognized in a given length or intermittently recognized.

If the determination in step S120 is positive, in consecutive step S130, the road shape is determined. As used herein, the term "road shape" refers to a single line, representing a twisting pattern on the road extending from the own vehicle to a forward area, which is designated in, for instance, a single dot line as shown in FIGS. 3 and 4. The single dot line, shown in FIGS. 3 and 4, represents a widthwise centerline of a traffic lane on which the own vehicle is running. However, in place of the single dot line, the road shape may include either one of the white lines placed on both sides of the traffic lane on which the own vehicle is running. In an alternative, with the road having plural traffic lanes, the road shape may include a widthwise centerline of a whole of the road.

Meanwhile, if the determination in step S120 is negative, then, in step S140, the operation is executed to determine whether or not the drive support ECU 26 detects a forward vehicle. If such determination is positive, then, the drive support ECU 26 calculates a distance from the forward vehicle and a relevant relative azimuth. Thus, in step S150, the operation is executed to determine a location of the relevant forward vehicle in the image based on the distance from the calculated forward vehicle and relative azimuth.

In subsequent step S160, the operation is executed to determine a steering angle of a steering wheel in response to a signal from the steering sensor 18. In step S170, the operation is executed to determine the road shape by connecting a given point (such as, for instance, a vehicle widthwise center point of a bonnet at a boundary line thereof on the image) in the image of the own vehicle, which is preliminarily determined as an end point of a line for representing the road shape, and the location of the forward vehicle in the image, determined in step S150, to each other using a circular arc with a radius of curvature indicative of the steering angle determined in step S160.

If the determination in step S140 is also negative, then, the operations are executed in steps 180 to S190. First, in step S180, the steering angle is determined based on the signal from the steering sensor 18. In succeeding step S190, the circular arc is determined on the line, indicative of the road shape, such that a tangential line is parallel to a vehicle fore and aft direction at the given point in the image on the given point preliminarily determined as the end point of the line representing the road shape for the own vehicle. Also, in either one of or in both of steps S160 and S180, the yaw rate may be detected in response to a signal from the yaw-rate sensor 16 in place of detecting the steering angle.

In steps S130, S170, S190, comparing the respective determined road shapes allows the operation in step S130 to be executed for determining the road shape based on the white line indicated along the road. Thus, the road shape can be determined in the highest precision. In addition, the operation in step S170 is executed using, in addition to the steering angle, the location of the forward vehicle. This enables the road shape to be more accurately determined than that achieved in step S190 based on only the steering angle. On the contrary, if no white line is recognized in step S130, no road shape is determined. Moreover, if no forward vehicle is detected, then, no road shape is determined in step S170. However, the road shape can be surely determined in step S190.

With the road shape determined in such a way, the far-flung region determining operation (in step S200 in FIG. 2) is executed. The far-flung region determining operation is an operation as shown in FIG. 6 in detail.

Figure 6:
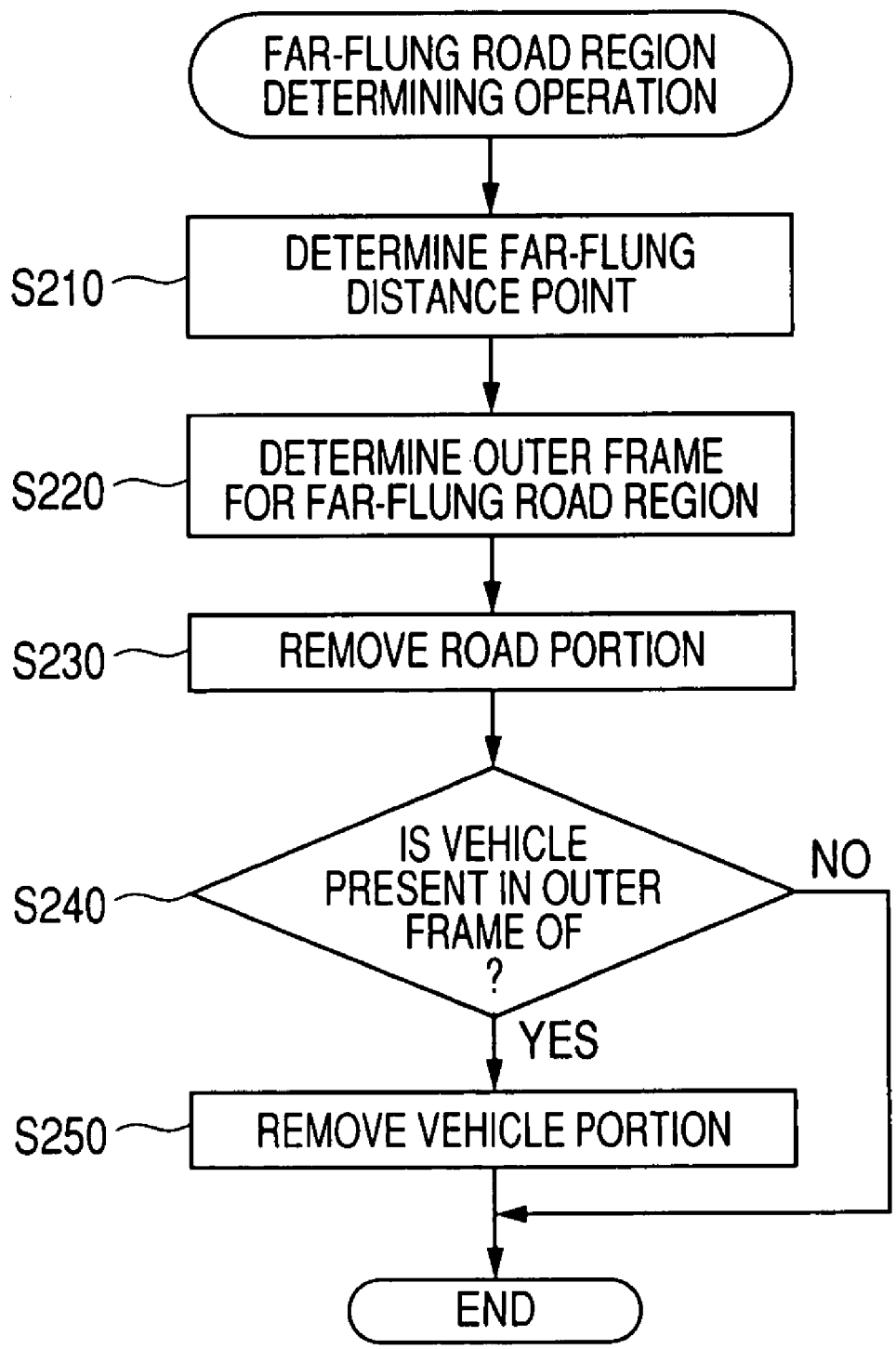
FIG. 6 is a flowchart showing a detail of a far-flung road region determining operation in step S200 shown in FIG. 2.

In FIG. 6, first in step S210, the operation is executed to determine a far-flung distance point on the image in a given far-flung distance from the own vehicle on the road on which the own vehicle is running. As used herein, the term "given far-flung distance" refers to a distance set in 100 m. However, the present invention is not limited to such a distance of 100 m and may suffice to include a far-flung distance with an extent under which the image gets blurred when fog is dense to some extent.

Figure 7:
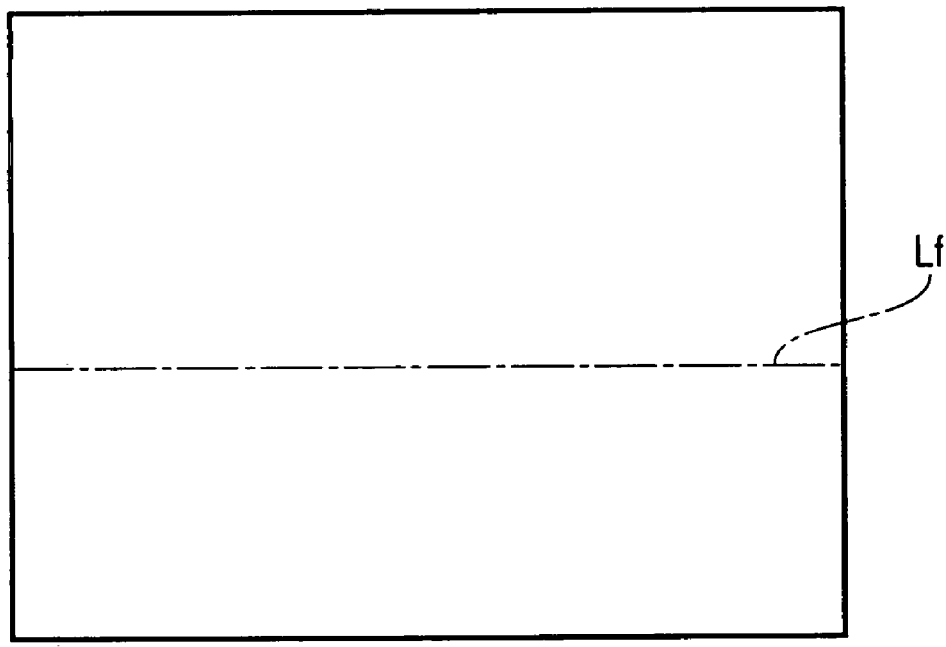
FIG. 7 is a view showing a 100 m line LF that is preliminarily set in the image picked up by the on-vehicle camera 12.

With the on-vehicle camera 12 fixedly secured to the vehicle, it is possible to preliminarily determine a real distance to a surface point on a flat ground surface and which of the image the surface point is located. Accordingly, it becomes possible to preliminarily determine a 100 m line on which the surface point ahead of the own vehicle distanced by 100 m is located on the flat ground surface on the image. FIG. 7 shows the 100 m line Lf in the image. With the present embodiment, the 100 m line Lf represents a far-flung distance line and stored in the ROM inside the image processing ECU 14 or other storage device.

Next in step S210, the operation is executed to determine an intersecting point between the 100 m line and a line, indicative of the road shape determined in step S100, to be a far-flung distance point (that is, a point ahead in 100 m) on the road on which the own vehicle is running.

In succeeding step S220, an outer frame OF in the far-flung road region is determined on a reference of the far-flung distance point determined in step S210. The outer frames OF in the far-flung road regions, shown in FIGS. 3 and 4, are set such that the far-flung distance point, determined in step S210, is placed at a center on a lower side of each outer frame OF. In addition, the outer frame OF has a size that is set to an adequately small size with respect to a size of a whole image picked up by the on-vehicle camera 12.

Further, FIGS. 3 and 4 show preset examples of outer frames AF of areas (hereinafter referred to as "sky areas") corresponding to sky in the vicinity of the vehicle. Respective positions of the outer frames AF in such sky areas on the images are stored in the ROM inside the image processing ECU 14 or another storage device.

The present invention is not limited to the examples shown in FIGS. 3 and 4 and the positions of the outer frames OF may be determined such that the far-flung distance point forms a center of the far-flung road region. Further, a location of the far-flung distance point relative to the outer frame OF of the far-flung road region may be altered depending on: whether the road shape is based on a widthwise centerline of a cruising lane; whether the road shape is based on a widthwise centerline of an entire road; and which of the white lines of the cruising lane is applied to the road shape. For instance, under a circumstance where the road shape (a line indicative thereof) is based on the white line on the right side of the cruising lane, the location of the outer frame OF may be determined such that the outer frame OF, forming the far-flung road region, has the lower side with a point on ¼ the length thereof from the right side to be set for the far-flung distance point.

Figure 8:
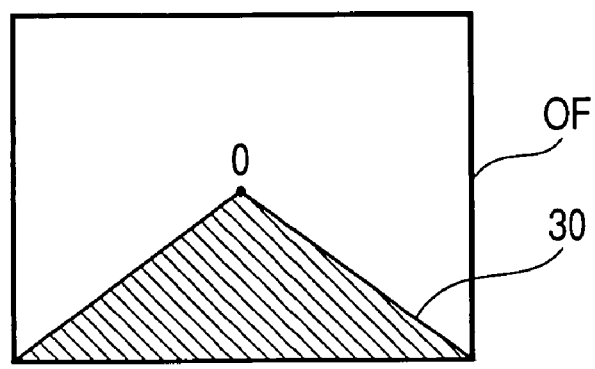
FIG. 8 is a view showing a fixed road portion 30 that is preliminarily set.

In consecutive step S230, the road portion is removed from the area of the outer frame OF of the far-flung road region determined in step S220. With the present embodiment, the operation is executed to remove a fixed road portion 30 that is preliminarily set as shown in FIG. 8. The road portion 30 includes a triangular portion with a center "O" of the outer frame OF allocated to an apex and a lower side of the outer frame OF aligned on a bottom side.

The road portion, actually picked up in the outer frame OF on the image, is different in shape depending on a width of a road being cruised on and the road shape contoured in a straight road or a curved road. With the above view in mind, if the road portion 30 is formed in such a fixed region, it becomes hard to accurately remove the road portion from the outer frame OF of the actually picked-up image. However, if the road is formed in any shape, the road portion becomes narrower with an increase in distance from the lower side to the upper side in the far-flungroad region. Therefore, even if the road portion 30 for removal is fixed, a major part of the road portion can be removed. In addition, with the road portion 30 fixed in such a way, a load in calculating operations can be alleviated. As the road portion 30 is removed in step S230, a resulting area after the removal has a relatively large roadside proportion.

Moreover, the road portion can be determined based on a road shape determined in step S100 without fixing the road portion 30. In such a case, for instance, if the line indicative of the road shape and the outer frame OF of the far-flung road region intersect at only one point (see FIG. 3), the road portion is aligned on a triangular shape with an apex placed at a vanishing point and the lower side of the outerframe OF to a bottom side. Meanwhile, if the line indicative of the road shape and the outer frame OF of the far-flung road region intersect at two intersecting points (see FIG. 4), the road portion may suffice to be a right triangle with an apex, allocated to one intersecting point (or a point in an upper area than the intersecting point by a given coordinate) that does not intersect a portion of the outer frame OF forming no lower side, and the lower side of the outer frame OF allocated to a bottom side. In addition, the road portion may be determined on the ground of the white line recognized upon processing the image.

In consecutive step S240, the operation is executed to determine whether or not a vehicle portion is present in the outer frame OF of the far-flung road region determined in step S220. Such determination is made for removing the vehicle in a short range from the image of the far-flung road region because if the vehicle in the short range is included in the image determined to be the far-flung road region, it becomes hard to determine the presence of fog. Accordingly, first in step S240, the operation is executed to determine whether or not the drive support ECU 26 detects the existence of any vehicle in front. If the existence of a forward vehicle is detected, then, an operation is further executed to determine an image processing range, deemed to include the vehicle, based on a location and a relative distance of the forward vehicle specified with the drive support ECU 26 while executing known image processing to the resulting image processing range for determining a vehicle contour line based on, for instance, a variation in brightness. Then, the determined vehicle portion is compared to the outer frame OF of the far-flung road region.

If the determination in step S240 is negative, then, a current routine, shown in FIG. 6, is completed intact. In this case, an area, in which the road portion 30 is removed from the area of the outer frame OF determined in step S220, represents the far-flung road region. Meanwhile, if the determination in step S240 is positive, then, in step S250, the area, in which the roadportion, determined in judgment in step S240, is removed from the area of the outer frame OF determined in step S220, is determined to be the far-flung road region.

With the far-flung road region for the image determined in such a manner set forth above, a determination image processing is executed in step S300 for the determined far-flungroad region and the sky region to determine the presence of fog. Consequently, it can be said that the far-flung road region and the sky region represent an image processing region for the determination image processing to be executed for determining the presence of fog.

Figure 9:
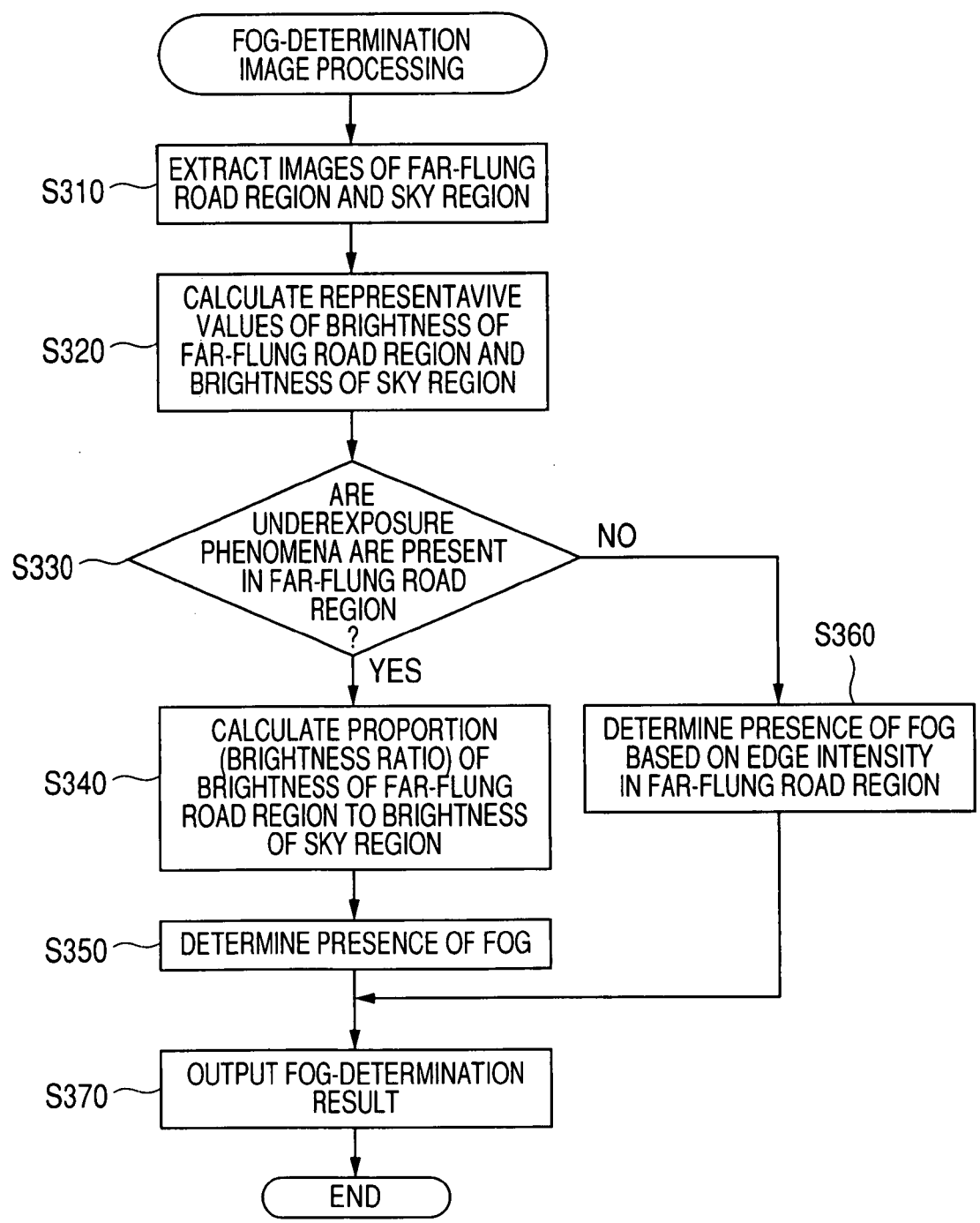
FIG. 9 is a flowchart showing a detail of an image processing for determining the presence of fog in step S300.

The determination image processing in step S300 for determining the presence of fog is executed in a basic sequence shown in FIG. 9 in detail. In FIG. 9, first in step S310, the operation is executed to extract an image of the far-flung road region and an image of the sky region. For the sky region, it is preferable to extract an image of a high-brightness sky region representing an accentuated high brightness in the sky region. That is, sometime the image of the sky region reflects merely sky and reflects an image with the inclusion of roadside objects such as an electric pole or a tree around the road. Therefore, extracting the image of the high brightness sky region representing the accentuated high brightness in the sky region enables the extraction of an image of a region in which only sky is reflected.

In step S320, the operation is executed to calculate a typified brightness of the far-flung road region and the sky region based on the images of the far-flung road region and the sky region, respectively. For instance, a brightness average value of pixels, contained in the respective regions, is calculated as the typified brightness. Such an operation results in a capability of obtaining a brightness of the sky from the image picked up by the on-vehicle camera 12.

In step S330, a judgment is made whether or not the underexposure phenomena is present in the far-flung road region based on the typified brightness value of the far-flung road region. If the judgment in step S330 is positive, then, the operations in step S340 to S350 are executed to judge the presence of fog using the typified brightness of the far-flung road region and the typified brightness of the sky region. If the judgment in step S330 is negative, then, the operation in step S360 is executed to judge the presence of fog based on an edge intensity of the far-flung road region, that is, based on an a rate of change of brightness in the far-flung road region of the image.

That is, with the operation executed in step S350 for making a judgment on the presence of fog using the brightness of the sky as a comparison object for the brightness of the far-flung road region, even if the underexposure phenomena occurs in the far-flung road region, the presence of fog can be precisely determined. Meanwhile, if no underexposure phenomena are present in the far-flung road region (during nonoccurrence of the underexposure phenomena), using such a far-flung road region makes it possible to determine the presence of fog.

For this reason, in image processing for determining the presence of fog, the presence of fog can be determined using the image of the far-flung road region during the nonoccurrence of the underexposure phenomena in the far-flung road region. Meanwhile, during the occurrence of the underexposure phenomena in the far-flung road region, the presence of fog can be determined using the brightness of the far-flung road region and the brightness of the sky region. Thus, the area of the image, picked up by the on-vehicle camera 12, is selected (switched) for use in determining the presence of fog. This allows the presence of fog to be determined using the brightness of the far-flung road region and the brightness of the sky region at all times. This results in a reduction in a load for the image processing to be executed.

Moreover, the operation in step S360 is executed in the same fashion as that disclosed in a Japanese Patent Laid-open publication No. 2006-349492 in FIG. 9 filed by the same Applicant and related description is herein omitted.

In step S340, the operation is executed to calculate a proportion (brightness ratio) of a typified brightness of the far-flung road region relative to the brightness of the sky region as expressed in a formula 1.

Brightness Ratio=Typified Brightness of Far-flung Road Region/Typified Brightness of Sky Region (Formula 1)

Figure 10:
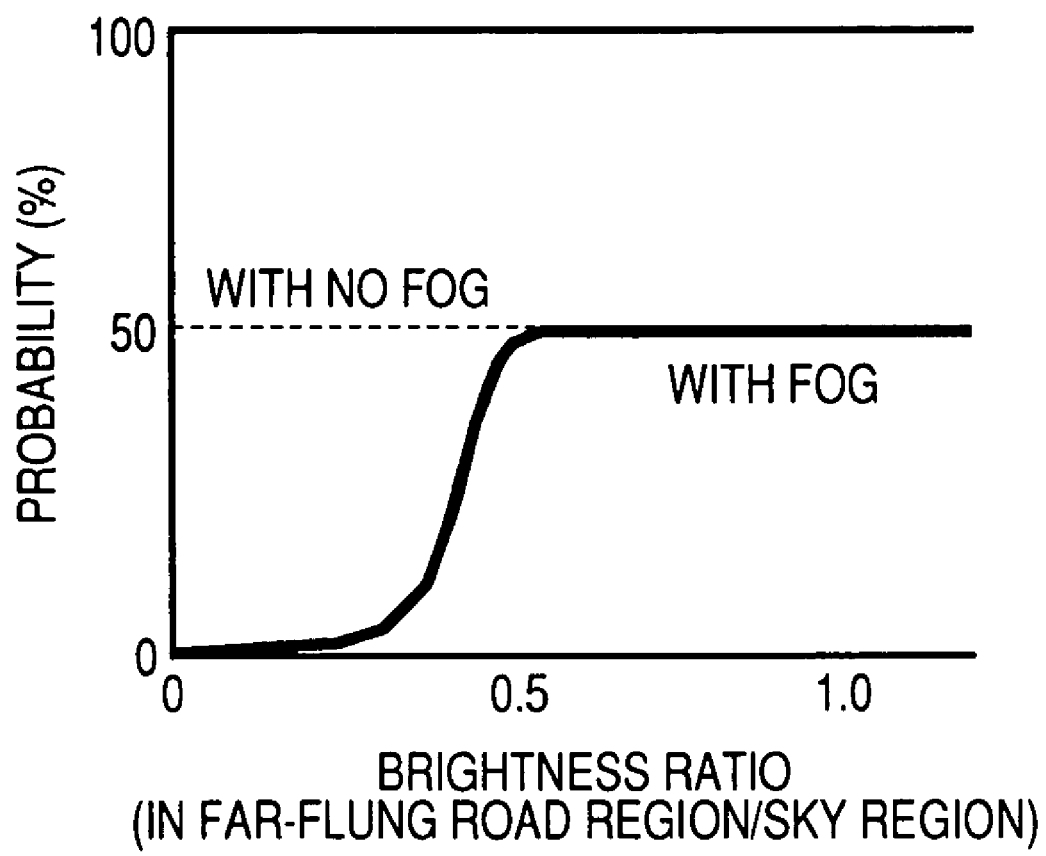
FIG. 10 is a view showing a brightness ratio probability distribution map representing a ratio of a brightness of the far-flung road region to a brightness of a sky region.

In step S350, the brightness ratio, obtained from the calculation in step S340, is applied to a probability distribution map shown in FIG. 10. This allows the determination of a probability in which the image, picked up by the on-vehicle camera 12, is enveloped in fog. Hereunder, description will be made of the probability distribution map with reference to FIG. 10.

With fog rising around the vehicle, the brightness of the sky region and the brightness of the far-flung road region have approximate values. Therefore, the ratio (brightness ratio) of the brightness of the far-flung road region to the brightness of the sky region largely distributes in the order of 0.5 to 1.0.

In that case, it is conceived that if no fog rises, the brightness of the sky region and the brightness of the far-flung road region do not have approximate values and the brightness ratios largely distributed in a range deviated from a range in the order of 0.5 to 1.0. However, it is turned out upon experiments conducted by the present inventor that the brightness ratio in the absence of fog distributes in a wide range including a range in the order of approximately 0.5 to 1.0 due to ununiformly-variations in the distributed running scenes of the vehicle.

It is apparent from a distribution of the brightness ratio in the presence of fog and a distribution of the brightness ratio in the absence of fog that the brightness ratio in the absence of fog is distributed in a wide range covering a range in the order of approximately 0.5 to 1.0. Therefore, the range in the order of approximately 0.5 to 1.0 in which the brightness ratio is largely distributed in the presence of fog cannot clearly ascertain whether or not fog is raising (accordingly, as shown in FIG. 10, with the brightness ratio ranging from approximately 0.5 to 1.0, the images picked up by the on-vehicle camera 12 have the same extents (at a probability of approximately 50%) of probabilities such that a probability of the image in the presence of fog nearly equals to a probability of the image in the absence of fog as shown in FIG. 10). In addition, it can be said that the rightness ratio in the presence of fog is largely distributed in a range (i.e., a range in the order of approximately 0 to 0.5 shown in FIG. 10), deviated from the range of approximately 0.5 to 1.0, has a high probability in which at least no fog is present.

Accordingly, in step S350, the operation is executed to make a determination using the probability distribution map (see FIG. 10) in which the less the brightness ratio, the greater will be the probability of the image, picked up by the on-vehicle camera 12, not to be enveloped in fog (in a non-fog state) and the greater the brightness ratio, the less will be the probability for the image, picked up by the on-vehicle camera 12, not to be enveloped in fog up to a ceiling of the probability (of approximately 50%) in which the probability of the image in the absence of fog and the probability of the image in the absence of fog nearly equals each other. This enables the presence of fog to be precisely determined regardless of the environmental situation of the vehicle.

In step S350, a judgment result on the probability, as to whether or not the image, picked up by the on-vehicle camera 12, is the image enveloped in fog, is output via the in-vehicle LAN 24.

With the embodiment set forth above, using the brightness of the sky as the comparison object for the brightness of the far-flung road region allows the presence of fog to be determined. That is, in the daytime in the absence of fog, the far-flung road region exhibits a lower brightness than that of the sky around the vehicle regardless of the underexposure phenomena occurring in the far-flung road region. Meanwhile, in the daytime in the presence of fog, particles of fog scatters the sunlight, causing the on-vehicle camera 12 to pick up an image in a wholly whitened area. Therefore, the brightness of the far-flung road region and the brightness of the sky have approximate levels. Accordingly, by determining the presence of fog with the use of the brightness of the sky as the comparison object for the brightness of the far-flung road region, the presence of fog can be precisely determined.

With such a structure mentioned above, the on-vehicle fog-presence determining apparatus of the present invention has advantages as described below.

The present invention is directed to the on-vehicle fog-presence determining apparatus including the image fog-state determining means for determining whether or not the image, picked up by the on-vehicle camera 12 mounted on the vehicle, is enveloped in a fog, the far-flung brightness acquiring means for acquiring the brightness of the far-flung road region, representing the region over the road in the given far-flung distance from the vehicle, in the image picked up by the on-vehicle camera 12, and the sky brightness acquiring means for acquiring the brightness of the sky around the vehicle. The image fog-state determining means makes the judgment using the brightness of the far-flung road region and the brightness of the sky.

With no fog rising in the daytime, the far-flung road region has the lower brightness than that of the sky around the vehicle regardless of the underexposure phenomena occurring in the far-flung road region. Meanwhile, with fog present in the daytime, the particles of fog scatter the sunlight, causing the on-vehicle camera to pick up an image in a wholly whitened state. Therefore, the far-flung road region and the sky have approximately the same brightness level.

Thus, by using the brightness of the sky as the comparison object for the brightness of the far-flung road region, the presence of fog can be precisely determined.

Moreover, with no underexposure phenomena occurring in the far-flung road region (during a nonoccurrence of the underexposure phenomena), the presence of fog can be determined using only such a far-flung road region. Therefore, the image fog-state determining means may make the determination using the image of the far-flung road region during the nonoccurrence of the underexposure phenomena whereas during the occurrence of the underexposure phenomena, the determination may be made using the brightness of the far-flung road region and the brightness of the sky.

Thus, by selecting (switching) the region in the image, picked up by the on-vehicle camera, depending on the existence of or nonexistence of the underexposure phenomena in the far-flung road region for use in determining the presence of fog, no need arises for determining the presence of fog using the brightness of the far-flung road region and the brightness of the sky at all times. This results in a reduction in load for the image processing to be executed.

Further, with the present invention, the on-vehicle fog-presence determining apparatus includes the road shape determining means for determining the shape of the road, on which the vehicle is running, in the image picked up by the on-vehicle camera, and the far-flung road region determining means for determining the far-flung road region in the image based on the shape of the road determined with the road shape determining mean. This enables the far-flung road region to be determined in the image.

Furthermore, with the present invention, the on-vehicle fog-presence determining apparatus includes the sky region image extracting means for extracting the image, indicative of the sky region representing the region corresponding to the sky around the vehicle, from the image picked up by the on-vehicle camera, wherein the sky brightness acquiring means acquires the brightness of the sky region.

Moreover, the sky region image extracting means may preferably extract the image of the high brightness sky region exhibiting the accentuated high brightness in the sky region. It is likely that sometimes the image of the sky region merely reflects the sky and sometimes the image of the sky region reflects the image inclusive of the roadside objects such as the electric pole and trees present in the vicinity of the road.

Therefore, extracting the image on the accentuated high brightness area in the sky region enables the image for the area reflecting only the sky to be extracted.

Further, the sky brightness acquiring means may preferably acquire the brightness of the sky around the vehicle using the output brightness value of the illuminance sensor mounted on the vehicle. Since the vehicle is installed with the illuminance sensor for automatically lighting on or lighting off the headlights, using the output brightness value of the illuminance sensor provides no need for executing the image processing for acquiring the brightness of the sky region.

Meanwhile, with fog rising, the brightness of the sky and the brightness of the far-flung road region have approximate values. Therefore, the ratio of the brightness of the far-flung road region to the ratio of the brightness of the sky (i.e., the brightness of the far-flung road region/the brightness of the sky which will be referred to as "brightness ratio") largely distributes in the range of approximately 0.5 to 1.0.

In that case, it is conceived that with no fog rising, the brightness of the sky and the brightness of the far-flung road region have no approximate values and the brightness ratio largely distributes in a range deviated from the range of approximately 0.5 to 1.0. However, it has been turned out upon experiments conducted by the inventor of the present patent application that the brightness ratio with the nonoccurrence of fog distributes in a wide range involving the range of approximately 0.5 to 1.0 because the running scene of the vehicle is nonuniform.

It is apparent from the distribution of the brightness ratio with the occurrence of fog and the distribution of the brightness ratio with the nonoccurrence of fog that the brightness ratio with the nonoccurrence of fog distributes in the wide range inclusive of the range of approximately 0.5 to 1.0. Therefore, the range approximately from 0.5 to 1.0 in which the distribution of the brightness ratio with the occurrence of fog, does not clearly ascertain whether fog is present or absent. Thus, it can be said that the range, deviated from the range of approximately 0.5 to 1.0 in which the brightness ratio with the occurrence of fog largely distributes, has a high probability in which fog is absent.

Furthermore, with the present invention, the on-vehicle fog-presence determining apparatus focuses on the discriminative points described above. The image fog-state determining means makes a judgment using the probability distribution map. The probability distribution map has a characteristic function in which the smaller the brightness ratio representing the proportion of the brightness of the far-flung road region to the brightness of the sky becomes, the greater probability the image picked up by the on-vehicle camera 12 not to be enveloped in fog becomes. In contrast to this, if the brightness is lower than a threshold value at which the probability for the image in the absence of fog and another probability for the image in the presence of fog nearly equal to each other, the greater the brightness ratio is, the smaller the brightness ratio representing the proportion of the brightness of the far-flung road region to the brightness of the sky not to be enveloped in fog becomes, the lower the probability which the image picked up by the on-vehicle camera 12 is not to be enveloped in fog is. This enables the presence of fog to be precisely determined regardless of the vehicle under the running scene.

(Modifications)

In the foregoing, while the present invention has been described above with reference to the embodiment, the present invention is not limited to such an illustrated embodiment. The following embodiments fall within the technical scope of the present invention and, further, the present invention may be implemented in various modifications besides the following embodiments without departing from the spirit and scope of the invention.

For instance, in the illustrated embodiment mentioned above, in step S330, the operation is executed to determine whether or not the underexposure phenomena occur in the far-flung road region and with the nonoccurrence of the underexposure phenomena upon which the presence of fog is determined using only the image of the far-flung road region with the nonoccurrence of the underexposure phenomena areas. In an alternative, the operation may be executed to determine the presence of fog in step S350 upon calculating the brightness ratio in step S340 at all times except for the determining operation in step S330 and the operation in step S360 for determining the presence of fog.

In the illustrated embodiment, further, during the image processing operation in determining the presence of fog in FIG. 9, the operation is executed to acquire the brightness of the sky based on the typified brightness in the sky area. Under a circumstance where the illuminance sensor is mounted on the vehicle like the illustrated embodiment, the operation may be executed to acquire the brightness of the sky around the vehicle using the output brightness value of the illuminance sensor. This is because using the output brightness value of the illuminance sensor results in no need for the image processing to be executed for acquiring the brightness of the sky area.

In the illustrated embodiment, furthermore, the white line is recognized as the on-road traffic sign for determining the shape of the road. The on-road traffic sign includes, besides the white line, protruding segments (hemispheroids, bar-like segments, etc.), a center reserve, road gullies on roadsides, wheel ruts, etc. Thus, the shape of the road may be determined upon recognizing these factors.

In the illustrated embodiment, further, the road portion is removed from the outer frame OF of the far-flung road region upon which if the vehicle portion is present, then, the region from which the vehicle portion is removed is allocated to the far-flung road region. However, it is not essential for the road portion or the vehicle portion to be removed and the presence of fog may be determined using a whole of the image of the far-flung road region.

In the illustrated embodiment, moreover, the shape of the road is determined upon connecting the given end point on the own vehicle in the image and the location of the forward vehicle with the circular arc with the radius of curvature composed of the steering angle. However, under a circumstance where the millimeter-wave radar 20 is configured to detect only a vehicle within a relatively narrow range for a vehicle fore and aft in a directional line, the shape of the road may be determined upon connecting the given end point on the own vehicle and the forward vehicle with a straight line. In such a case, no operation in step S160 (for detecting the steering angle) needs to be executed. In addition, for the purpose of detecting the forward vehicle, the millimeter-wave radar 20 may be replaced by a laser radar. Moreover, detecting a discriminative shape, such as rear lamps or a number plate, of the vehicle from the image may allow the forward vehicle to be detected.

While the illustrated embodiment has been described with reference to an example wherein the outer frame OF and close-in roadside area 32 are square shaped, no need arises for these to be square shaped and other shapes such as a circle or the like may be employed.

What is claimed is:

1. An apparatus for determining a presence of fog in an atmosphere around a vehicle, comprising:
   image capturing means mounted on the vehicle for capturing an image around the vehicle;
   first determining means for determining a sky region in the image;
   second determining means for determining a far-flung road region in the image;
   first acquiring means for acquiring a brightness of a sky around the vehicle based on the sky region of the image;
   second acquiring means for acquiring a brightness of the far-flung road region based on the far-flung road region of the image;
   judging means for judging whether or not an underexposure phenomenon is occurred in the far-flung road region of the image; and
   third determining means for determining whether or not fog is present in an atmosphere based on the brightness of the far-flung road region when a nonoccurrence of underexposure phenomena in the far-flung road region and the brightness of the far-flung road region and the brightness of the sky when an occurrence of the underexposure phenomena in the far-flung road region.

2. The apparatus according to claim 1, wherein
   the first determining means extracts a region of the image captured by the image capturing means, the region of the image having an accentuated high brightness from the entire image as the sky region of the image.

3. The apparatus according to claim 1, wherein
   the first acquiring means acquires the brightness of the sky around the vehicle using an output brightness value of an illuminance sensor mounted on the vehicle.

4. The apparatus according to claim 1, wherein
   the third determining means makes a judgment using a probability distribution map which has a tendency such that if a brightness ratio defined as a ratio of the brightness of the far-flung road region to the brightness of the sky becomes smaller, then a probability of the presence of fog is decreased, and if the brightness ratio becomes larger, then the probability of the presence of fog is increased.

5. A method for determining a presence of fog in an atmosphere around the vehicle equipped with an image capturing means for capturing an image around the vehicle, comprising steps of:
   determining a sky region in the image;
   determining a far-flung road region in the image;
   acquiring a brightness of a sky around the vehicle based on the sky region of the image;
   acquiring a brightness of the far-flung road region based on the far-flung road region of the image; and
   determining whether or not fog is present in an atmosphere based on the brightness of the far-flung road region during a nonoccurrence of underexposure phenomena in the far-flung road region and the brightness of the far-flung road region and the brightness of the sky during an occurrence of the underexposure phenomena in the far-flung road region.

* * * * *